(12) United States Patent
Barker et al.

(10) Patent No.: US 8,569,696 B2
(45) Date of Patent: Oct. 29, 2013

(54) IMAGING SYSTEM AND METHOD USING A PHOTONIC BAND GAP ARRAY

(75) Inventors: Delmar L. Barker, Tucson, AZ (US);
Abram G. Young, Tucson, AZ (US);
William R. Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1070 days.

(21) Appl. No.: 11/668,600

(22) Filed: Jan. 30, 2007

(65) Prior Publication Data
US 2008/0179523 A1    Jul. 31, 2008

(51) Int. Cl.
*G01J 5/00*    (2006.01)

(52) U.S. Cl.
USPC ...................................... 250/338.1

(58) Field of Classification Search
USPC ............. 250/332, 338.4, 339.01, 339.03, 250/339.02, 349, 352, 370.01, 370.06, 250/370.13, 370.15, 371, 338.1–338.5; 73/105, 774; 356/32
See application file for complete search history.

(56) References Cited

U.S. PATENT DOCUMENTS

| | | | |
|---|---|---|---|
| 3,444,322 A | | 5/1969 | Schagen et al. |
| 5,999,308 A | * | 12/1999 | Nelson et al. ................. 359/321 |
| 6,770,882 B2 | * | 8/2004 | Carr et al. .................. 250/338.1 |
| 6,834,149 B1 | * | 12/2004 | Dietz et al. .................... 385/122 |
| 7,187,491 B1 | * | 3/2007 | Bratkovski .................... 359/321 |
| 2003/0016926 A1 | * | 1/2003 | Hofstadler et al. ........... 385/125 |
| 2004/0104344 A1 | * | 6/2004 | Carr .............................. 250/332 |
| 2005/0030628 A1 | | 2/2005 | Wagner et al. |
| 2005/0082480 A1 | | 4/2005 | Wagner et al. |
| 2005/0117841 A1 | * | 6/2005 | Braun et al. ..................... 385/27 |
| 2005/0238310 A1 | * | 10/2005 | Hoshi et al. .................... 385/129 |
| 2006/0067605 A1 | * | 3/2006 | Mirkarimi et al. .............. 385/12 |
| 2006/0091284 A1 | * | 5/2006 | Viens et al. ................. 250/201.9 |
| 2007/0025657 A1 | * | 2/2007 | Oya et al. .......................... 385/4 |
| 2007/0107501 A1 | * | 5/2007 | Taber .............................. 73/105 |

OTHER PUBLICATIONS

Guney et al., "Design and simulation of photonic crystals for temperature reading of ultra-small structure", Lasers and Electro-Optics Society, 2001. LEOS 2001. The 14th Annual Meeting of the IEEE, vol. 1, Nov. 12-13, 2001 pp. 212-213.*

Trimm et al., "Dynamic MEMS-Based Photonic Bandgap Filter," 2005, IEEE Sensors Journal, vol. 5, No. 6, pp. 1451-1461.*

Blaikie et al., "Wide-field-of-view photonic bandgap filters micromachined from silicon," 2004, Microelectronic Engineering, vol. 73-74, pp. 357-361.*

Shklover et al., "Photonic Band gap materials: fabrication, modeling, and applications," 2006, Proceedings of SPIE, vol. 6243, pp. 62430Q-1-62430Q-11.*

(Continued)

*Primary Examiner* — Kiho Kim
(74) *Attorney, Agent, or Firm* — Renner, Otto, Boisselle & Sklar, LLP

(57) ABSTRACT

An imaging system (20) includes an array (24) of photonic band gap material cells. The band gap material has an absorption edge at about the emission frequency of a source (22) of electromagnetic energy. Images from a field of view (26) directed onto the photonic band gap array (24) increase the temperature of the illuminated cells, shifting the absorption edge frequency for those cells. A focal plane array (28) detects the electromagnetic radiation transmitted through the photonic band gap array (24) from the source (22). The intensity of the transmitted radiation is proportional to the shift in the photonic band gap edge.

14 Claims, 5 Drawing Sheets

(56) References Cited

OTHER PUBLICATIONS

Roger Allan; "Uncooled Thermal Imaging Has Mass-Market Appeal;" http://www.elecdesign.com/Articles/Print.cfm?ArticleID=10742; Jul. 21, 2005.
P. Halevi, et al.; "Tunable Photonic Crystals with Semiconducting Constituents;" The American Physical Society, Physical Review Letters; Aug. 28, 2000; pp. 1875-1878.
RedShift Systems, Corp. brochure; "Thermal Imaging—Coming Soon to a Parking Lot Near You;" 2005.
RedShift Systems, Corp. brochure; "RedShift 1160 Thermal Camera Engines;" 2005.
RedShift Systems, Corp. brochure; "RedShift 1000 Line of Thermal Security Camera Modules;" 2005.
P. Halevi et al.; "Spontaneous emission in a high-contrast one-dimensional photonic crystal;" Dec. 28, 2004.
W. Belhadj; "Thermal properties of photonic crystals;" Jan. 2, 2005.

\* cited by examiner

IMAGING SYSTEM AND METHOD USING A PHOTONIC BAND GAP ARRAY

FIELD OF THE INVENTION

This invention is directed to an imaging system and method, and in particular to an imaging system and method employing a photonic band gap material, with potential application in an infrared camera, for example, among other applications.

BACKGROUND

High quality infrared imaging systems are available, but many of these systems require expensive active cryogenic cooling, which limits imaging applications. The necessary cooling system requires additional energy and makes the imaging system larger, heavier, and more complex, and therefore more expensive to construct and operate.

In attempting to overcome one or more of these problems, uncooled infrared imaging systems have been developed. Uncooled infrared imaging systems typically include microbolometer elements or interferometers.

SUMMARY

Uncooled infrared imaging systems that use microbolometers or interferometers have been expensive and difficult to manufacture, however, and often have limited thermoelectric sensitivity. The present invention provides an imaging system and method that provide a thermo-optical sensitivity, particularly for infrared and near-infrared wavelengths, that improves on the limited thermoelectric sensitivity of microbolometers and interferometers.

An exemplary imaging system provided in accordance with the present invention includes an array of photonic band gap material cells having an absorption edge at about the emission frequency of a source of narrow band electromagnetic energy. Infrared images from a field of view directed onto the photonic band gap material cells increase the temperature of the illuminated cells, shifting the absorption edge frequency for those cells. A focal plane array detects the visible or near-infrared radiation from the narrow band source that has been transmitted through the photonic band gap material cells. The intensity of the transmitted radiation is proportional to the shift in the photonic band gap edge. Such a system provides increased sensitivity and dynamic range over prior uncooled infrared imaging systems.

More particularly, an exemplary system comprises a source of electromagnetic radiation having a specified wavelength, and an array of photonic band gap material cells positioned to receive the electromagnetic radiation from the source, where each cell has a photonic band gap material with an absorption edge at about the emission frequency of the narrow band source of electromagnetic radiation. The system also includes an optical assembly arranged to direct electromagnetic radiation from a field of view onto the photonic band gap array and thereby shift the absorption edge of illuminated cells, and a focal plane array positioned to receive electromagnetic radiation from the photonic band gap array and to detect electromagnetic radiation with the specified wavelength. The photonic band gap material has a high degree of absorption in a wavelength of interest to maximize absorption edge shift.

The present invention also provides a method, comprising the steps of:

(a) projecting electromagnetic radiation having a specified wavelength onto an array of photonic band gap material cells, where the photonic band gap material has an absorption edge at about the same frequency as the electromagnetic radiation projected onto the photonic band gap array;

(b) receiving an image from a field of view onto the photonic band gap array, thereby increasing the temperature of cells illuminated by the image from the field of view and shifting the photonic band gap absorption edge frequency of the illuminated cells; and (c) detecting electromagnetic radiation of the specified wavelength transmitted through the photonic band gap array.

Another exemplary imaging system provided by the present invention comprises the following elements:

(a) means for modulating transmission of electromagnetic radiation representative of an image from a field of view;

(b) means for projecting electromagnetic radiation of a specified wavelength on the modulating means;

(c) means for receiving electromagnetic radiation forming an image from a field of view at the modulating means; and (d) means for detecting electromagnetic radiation of the specified wavelength from the projecting means received from the modulating means.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
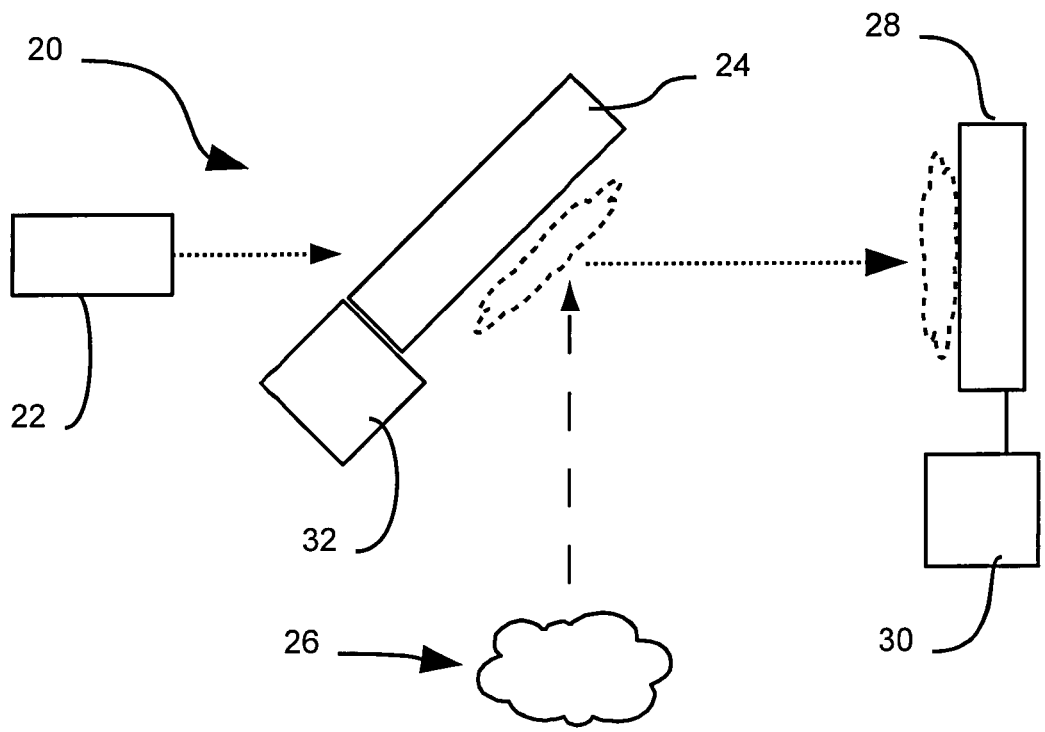
FIG. 1 is a schematic cross-sectional view of an imaging system provided in accordance with the present invention.

The present invention provides a system and method that use an array of photonic band gap material cells or pixels to modulate transmission of electromagnetic radiation of a selected wavelength. Thus the photonic band gap array can transmit an image to an image detector at a wavelength to which the image detector is particularly sensitive.

More particularly, the present invention provides a method that includes the steps of (a) projecting electromagnetic radiation of a specified wavelength from a source onto an array of photonic band gap material cells, and (b) receiving images from a field of view, particularly images including a wavelength of interest, onto the photonic band gap array. The wavelength of interest generally is different from the wavelength of radiation output from the source. The wavelength of interest is received from the field of view, and may include an infrared wavelength, for example. The wavelength from the source may be different, such as a shorter near-infrared wavelength or longer terahertz radiation. The method further includes the step of (c) detecting the electromagnetic radiation of the specified wavelength that passes through or is reflected from the photonic band gap array.

Photonic band gap materials, including those of the array, generally are characterized by at least two constituent materials with different refractive indices that are periodically spaced in one or more dimensions. A wide variety of constituent materials can be use to create a selected photonic band gap material, including metals, glasses, plastics, or combinations thereof. The periodic structure and the properties of the selected constituents making up the photonic band gap material create a band gap, a range of wavelengths of electromagnetic radiation that are reflected and cannot pass through the photonic band gap material. The photonic band gap effect is analogous to a similar effect on electrons in a semiconductor material. For all wavelengths in the band gap, the band gap material reflects electromagnetic radiation of any polarization, incident at any angle. A band gap material can have multiple band gaps, and the band gaps can shift with temperature changes.

The selected photonic band gap material in the array of cells has a high degree of absorption in the wavelength of interest and converts the absorbed wavelengths into heat. Consequently, in cells illuminated by the wavelength of interest, the temperature of the band gap material in those cells increases, shifting the band gap. The photonic band gap material in each cell has an absorption edge at about the frequency of the electromagnetic radiation from the narrow band source, and the temperature increase shifts the photonic band gap absorption edge frequency. The shift in the band gap changes the wavelengths transmitted or reflected through those cells, thereby providing a mask through which the radiation from the source passes in a pattern corresponding to the image from the field of view. The effect is analogous in some ways to silk screen printing, the band gap array functioning as the screen, and the radiation from the narrow band source functioning as the ink that produces the image. The intensity of the transmitted radiation is proportional to the shift in the photonic band gap edge. The band gap array thus filters the radiation from the source and effectively reproduces the image from the field of view in a wavelength that is readily detected by a detector.

Turning now to the drawings, and initially FIG. 1, an exemplary system 20 includes a source 22 of narrow band electromagnetic radiation having a specified wavelength, and a photonic band gap array 24 positioned to receive electromagnetic radiation both from the source 22 and in the form of an image of a field of view, generally represented at 26. The system 20 also includes a detector in the form of a focal plane array 28 positioned to receive and detect radiation at the specified wavelength from the band gap array 24.

The source 22 of electromagnetic radiation provides electromagnetic radiation having the specified wavelength, such as near-infrared wavelengths (about 0.75 micrometer to less than about 2 micrometers). The source 22 generally is selected from a laser and a light emitting diode (LED), and an exemplary source of electromagnetic radiation is a laser emitting radiation at a wavelength of approximately 0.85 micrometer. Lasers emitting radiation at this wavelength are commonly used in optical compact disk (CD) players and thus are readily available and relatively inexpensive. In addition, a laser generally provides tunable, high resolution, polarized electromagnetic radiation. The radiation from the source 22 is directed to the photonic band gap array 24, which selectively filters the incident radiation passed on to the focal plane array 28.

The source 22 of radiation generally is selected based on the sensitivity of the focal plane array 28 to the wavelength provided by the source 22, or vice versa. The focal plane array 28 includes an image sensor that detects electromagnetic radiation of the specified wavelength passing through or reflected from the photonic band gap array 24 and outputs an electrical signal representative of the image from the field of view. An exemplary image sensor is a charge-coupled device (CCD), particularly one sensitive to near-infrared wavelengths emitted from the source 22. CCD's sensitive to near-infrared wavelengths are mass-produced for digital cameras, and thus are readily available and relatively inexpensive, making such CCD's suitable for use with the 0.85 micrometer lasers used in CD players. Other types of image sensors could be used in place of the CCD, however.

In the illustrated embodiment, the focal plane array 28 is connected to a processor 30. The processor 30 can manipulate the image data in the electrical signal transmitted from the focal plane array 28 to refine the image or to create an image for display from the raw data provided by the focal plane array. The processor can include one or more of a microprocessor, a memory, and a display, such as a liquid crystal display (LCD) for displaying images in visible wavelengths. The processor can include an output connection for connecting the processor to another device for image storage or display, or both.

The illustrated system 20 also includes a thermal stabilizer 32 in contact with the photonic band gap array 24 to facilitate providing a relatively constant temperature across the array 24. While radiation from the field of view will desirably change the temperature of the band gap material in the array in a pattern that represents the image of the field of view, that temperature change must be "erased" so that a new image can be taken from the field of view. The time to cycle the band gap array 24 from a first image to a second image desirably is as short as possible. The thermal stabilizer 32 can facilitate adding or removing thermal energy from the photonic band gap array 24 to provide a more uniform temperature across the array 24 in preparation for receiving an image or a next image. In some applications a thermal stabilizer is not necessary, however, such as when the band gap material radiates thermal energy sufficiently to cool itself before a second image is required. An exemplary thermal stabilizer is a passive heat transfer device, such as a heat sink or radiator fins, but could include an active device, such as a fan or other small size, low or no power thermoelectric heat transfer device.

Figures 2, 3:
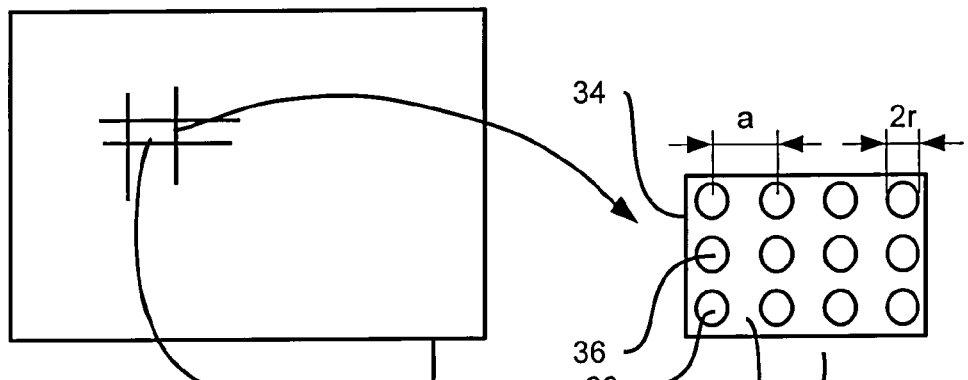
FIG. 2 is a schematic view of an array of photonic material cells (one cell shown) for use in an imaging system provided in accordance with the present invention.
FIG. 3 is an enlarged schematic view of the photonic material cell of FIG. 2.
Figure 4:
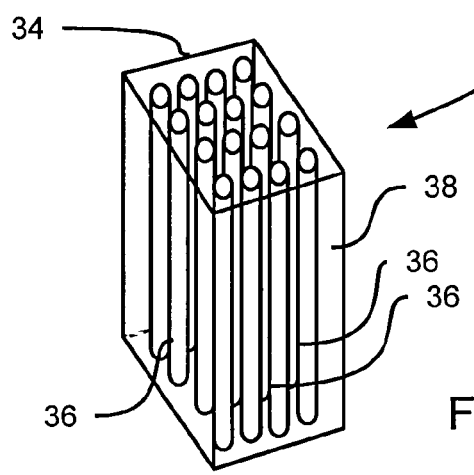
FIG. 4 is a schematic perspective view of the photonic material cell of FIG. 3.

The photonic band gap array 24 has a plurality of photonic band gap material cells or pixels 34, one of which is shown in FIGS. 2-4. The array 24 can have any arrangement of cells 34, including, for example, rectangular, triangular, and hexagonal arrangements. The selected photonic band gap material generally has a high thermal expansion coefficient and a refractive index that has a high temperature dependence, low mass, and balanced conduction and radiation cooling rates.

The photonic band gap material also has a high degree of absorption in the wavelength of interest, turning the absorbed radiation into heat, to maximize the absorption edge shift. Silicon and silicon nitride, for example, are exemplary constituent materials for a photonic band gap material for infrared imaging applications. An exemplary photonic band gap array can absorb electromagnetic radiation from the field of view in two different bands as the temperature changes, such as wavelengths of about 3-5 micrometers and about 8-10 micrometers.

In the embodiment illustrated in FIGS. 2-4, the photonic band gap material in each cell 34 has a plurality of cylinders formed of a first material 36 arranged in a periodic rectangular array in a second material 38. The spacing between the cylinders is approximately "a" and each cylinder has a dimension, in this case a diameter, of approximately 2r. The lattice constant is defined as r/a. The photonic band gap array can include other band gap structures in one or more dimensions, such as a hexagonal array of rods or holes, or an inverse opal structure. The photonic band gap array is temperature-sensitive and the lattice constant decreases proportionately with the increase in temperature. In addition to changing the lattice constant of the photonic band gap material with changes in temperature, other parameters that may change with temperature include symmetry and relative refractive index.

Figure 5:
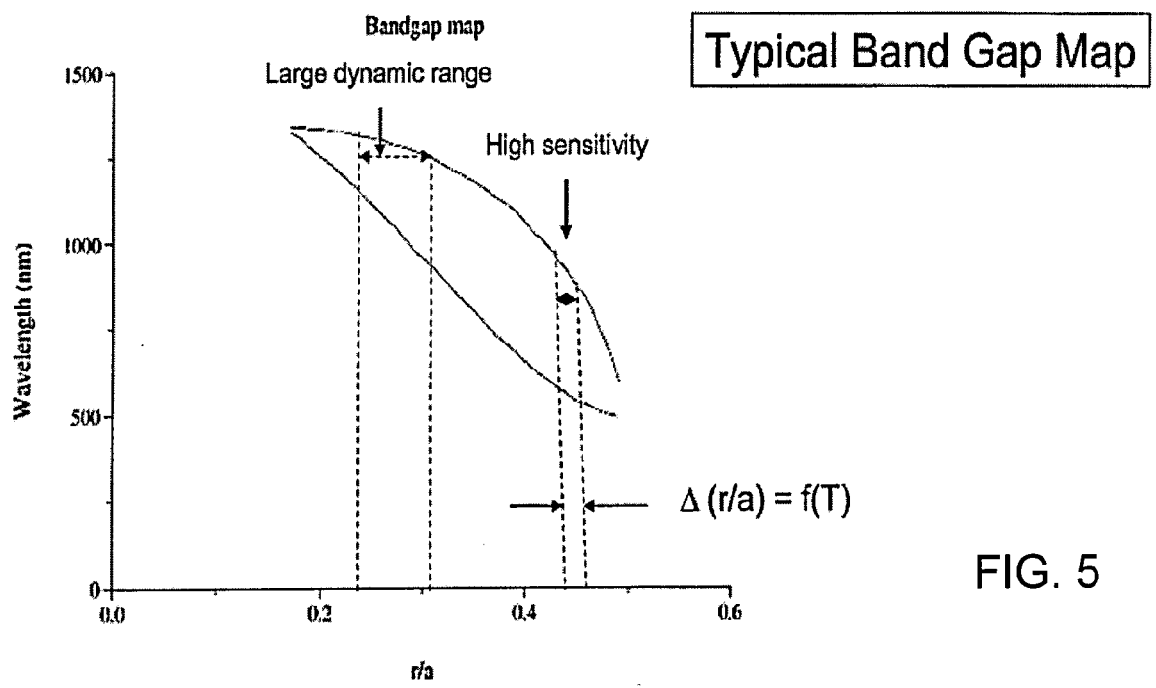
FIG. 5 is a schematic graph of a typical band gap map of wavelength vs. lattice constant as a function of temperature.

FIG. 5 is a typical band gap map for silicon nitride, which has an expansion coefficient (alpha) of $10^{-4}$, which is relatively large, providing a large change in lattice constant (r/a) with temperature. Not only is the change in the lattice constant a function of temperature, but the sensitivity of the lattice constant also is a function of wavelength.

Figures 6, 7:
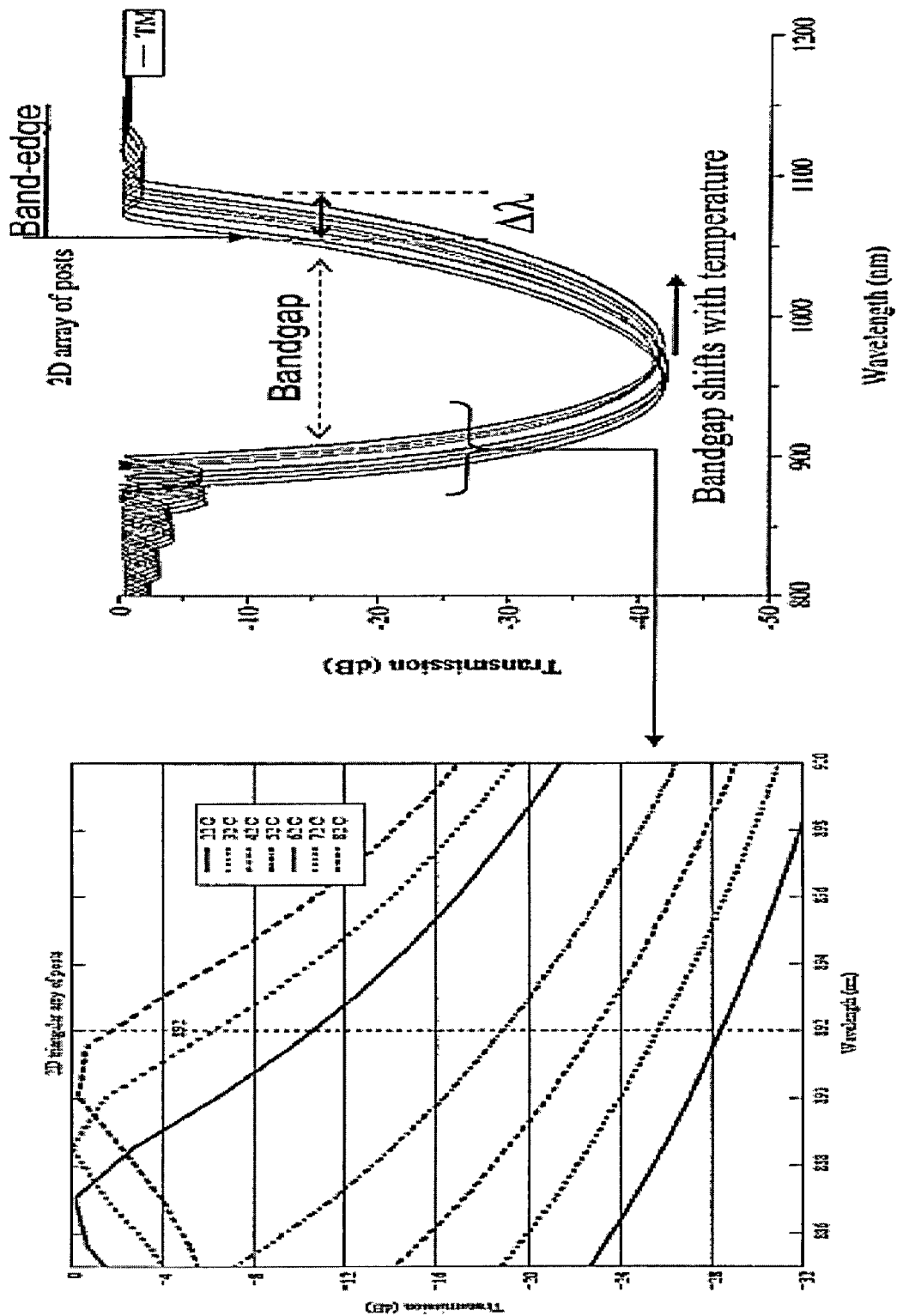
FIG. 6 is a graph of transmission vs. wavelength for a photonic band gap material cell modeled as a two-dimensional array of posts for different temperatures.
FIG. 7 is an enlarged graph of a portion of the graph of FIG. 6.
Figure 8:
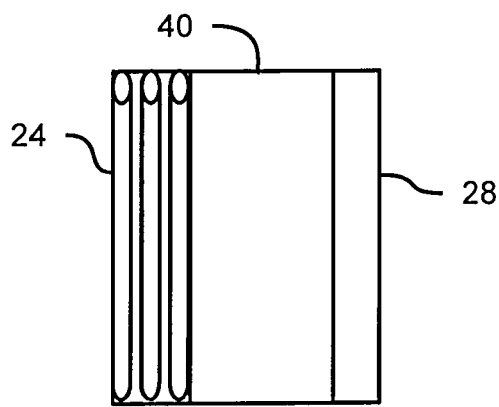
FIGS. 8-11 are schematic views of portions of an imaging system provided in accordance with the present invention in different arrangements.
Figure 9:
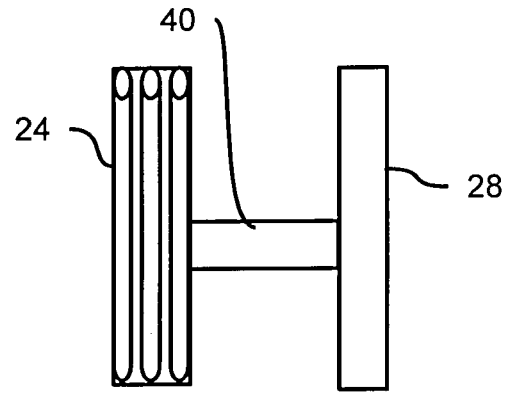

As shown in FIG. 6, for an exemplary band gap material that includes silicon and silicon nitride ($S_3N_4$) in a two dimensional array, the lattice structure of the photonic band gap material has been found to expand approximately 0.25% per 10° C. temperature rise when being heated by 8-10 micrometer infrared radiation, thereby shifting the band gap toward a range of longer wavelengths, and shifting the band edge as well.

An enlarged view of a section of the band edge shown in FIG. 6 is shown in FIG. 7. The band edge can undergo an approximately four to ten decibel change in the transmission of the electromagnetic radiation at a specified wavelength of about 850 nanometers (0.85 micrometer).

Figure 11:
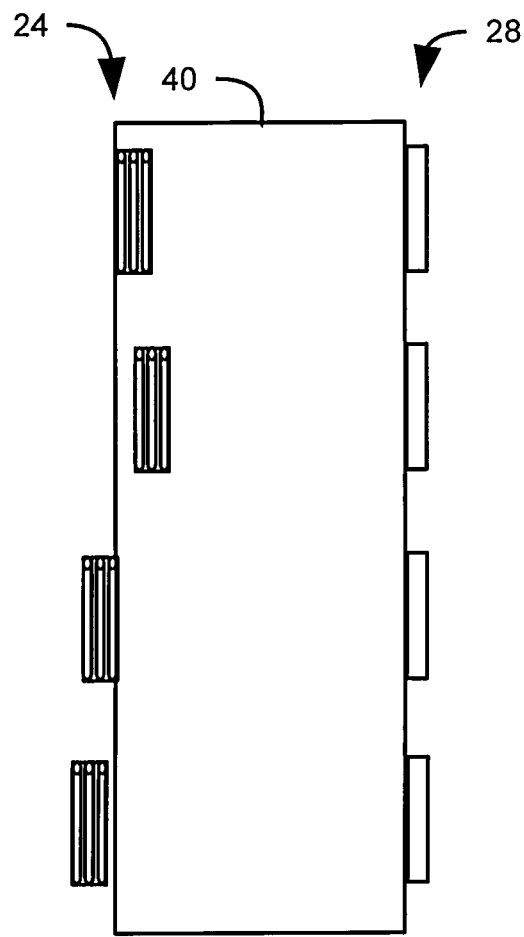
Figure 10:
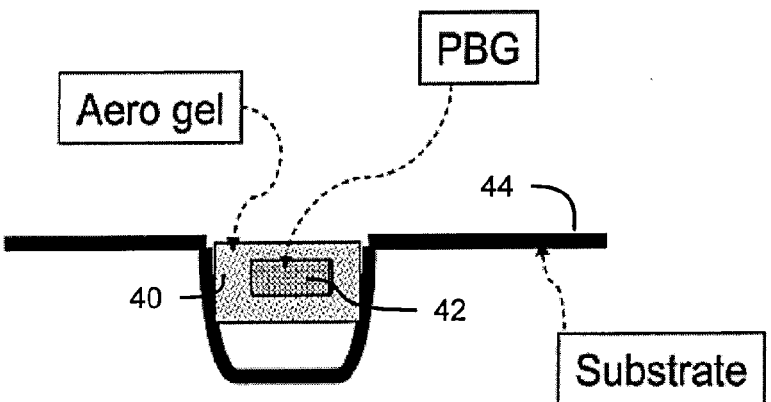
Figure 12:
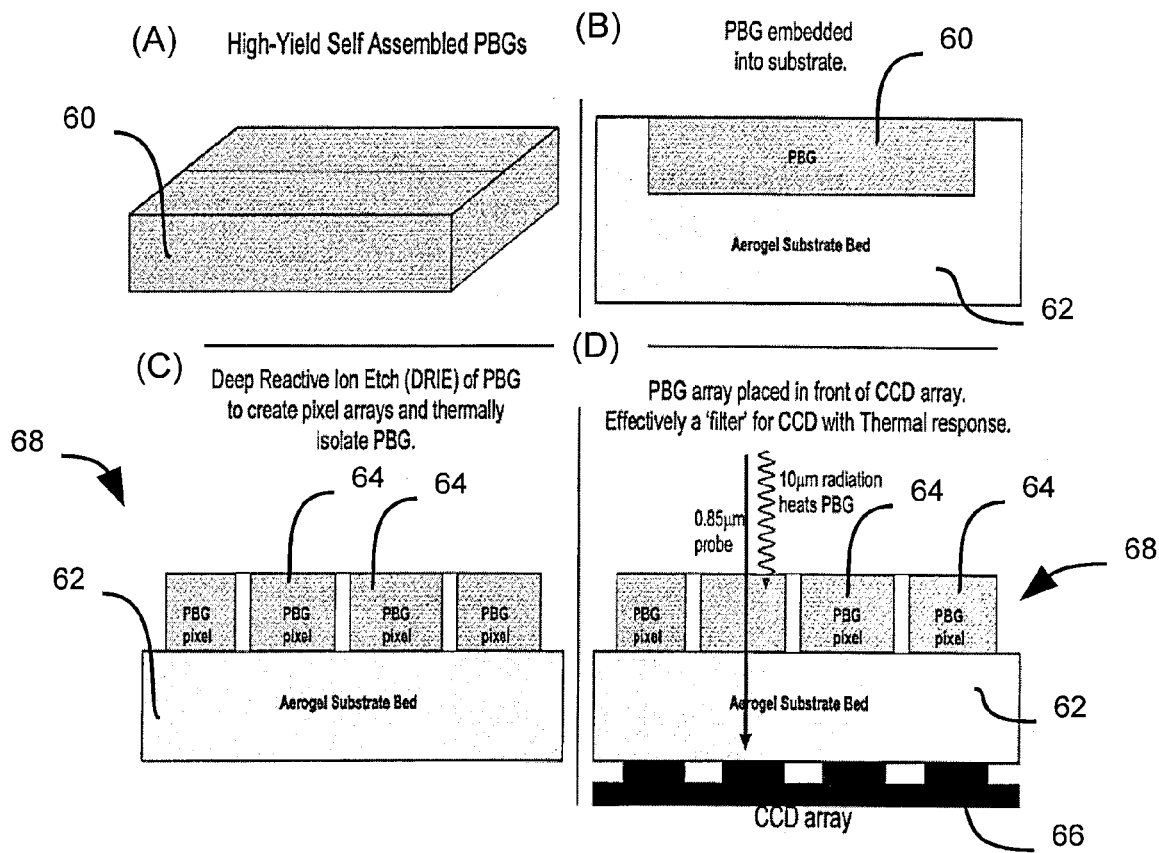
FIGS. 12(A)-(D) are sequential schematic illustrations of a portion of a system provided in accordance with the present invention over a sequence of steps in the construction process.

To preserve its temperature sensitivity, the photonic band gap array 24 generally is thermally isolated from the focal plane array 28 (FIG. 1). Spacing provides some degree of thermal separation, but in place of ambient air another insulating material may be more effective at minimizing heat transfer between cells of the band gap array 24 and between the band gap array 24 and the focal plane array 28. FIGS. 8-11 show exemplary ways to thermally isolate the photonic band gap array 24 from the focal plane array 28 using an insulating material 40, such as an aerogel. The aerogel is substantially transparent to the near-infrared wavelength of radiation transmitted through the photonic band gap array 24 to the focal plane array 28. The aerogel or other insulating material can be formed into columnar (FIG. 8) or planar (FIG. 9) insulators that are arranged to separate the photonic band gap array 24 from the focal plane array 28. As shown in FIG. 10, the photonic band gap material cells 42 that make up the array can be embedded in the insulating material 40 that is supported by a substrate 44. Alternatively, FIG. 11 shows several different ways that an insulating material 40 can separate cells of the photonic band gap array 24 and the focal plane array 28. The insulating material 40 typically is placed on the focal plane array 28. Then the cells of the band gap array 24 can be placed on an opposite side of the insulating material 40, spaced therefrom, or embedded to varying degrees in the opposite side of the insulating material 40.

Referring now to FIGS. 12(A)-(D), a method of constructing a photonic band gap material array begins with (A) a photonic band gap material 60, such as a high-yield self-assembled photonic band gap material. Alternatively, the photonic band gap material array can be mass-produced using photonic band gap optical fiber pulling methods, for example, to further decrease the cost of the system. The photonic band gap material 60 is embedded (B) into an insulating material 62, such as an aerogel. The photonic band gap material 60 is separated (C) into a plurality of cells or pixels 64, using a Deep Reactive Ion Etch (DRIE) procedure, for example. Before or after this segmentation of the photonic band gap material into cells, the photonic band gap material can be infiltrated with a liquid that has a refractive index that is strongly affected by temperature. The liquid may be a liquid crystal, for example. The composite is then placed (D) in front of a focal plane array 66 to filter the specified wavelength (0.85 micrometer, for example) based on the thermal response of the photonic band gap material's absorption of the desired wavelength of radiation from the field of view (10 micrometers, for example).

Figure 13:
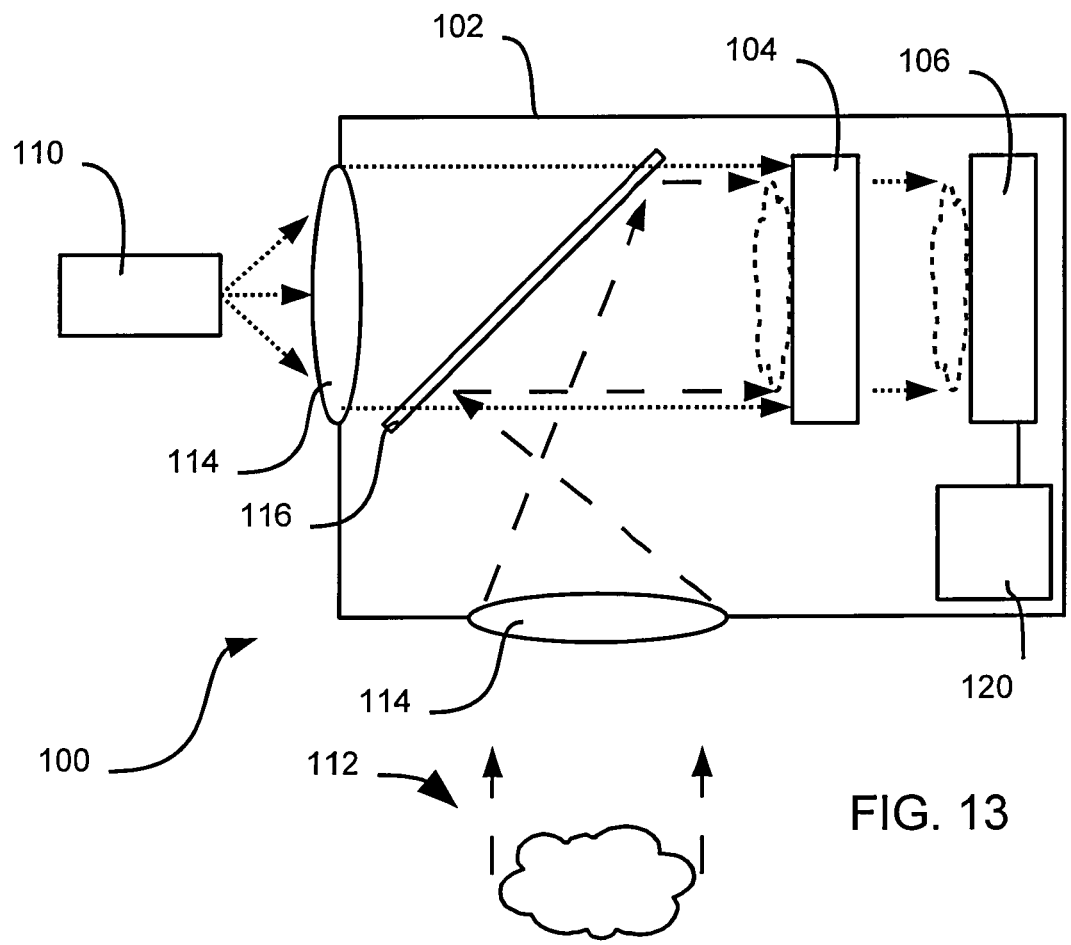
FIG. 13 is a schematic view of another exemplary imaging system provided in accordance with the present invention.

Another exemplary imaging system 100, such as a camera, is shown in FIG. 13. The illustrated system 100 includes a housing 102 that encloses at least the band gap array 104 and the focal plane array 106. The housing 102 is lined with a photonic band gap material that prohibits emission of electromagnetic radiation at wavelengths near the wavelength of interest, for example wavelengths of about 8-12 micrometers, to minimize thermal radiation onto the photonic band gap array 104 that otherwise might be emitted from the walls of the housing 102. Objects at room temperature typically emit infrared radiation at about this range of wavelengths.

The system 100 also can include an optical assembly arranged to direct radiation from both the source 110 and the field of view 112 onto the photonic band gap array 104, as shown. The optical assembly generally includes one or more lenses or mirrors to direct the electromagnetic radiation from the field of view and the source of electromagnetic radiation onto the photonic band gap array and then from the photonic band gap array to the focal plane array. The optical assembly in FIG. 1 includes both lenses 114 and a mirror transparent to the source radiation 116 that direct electromagnetic radiation from the source 110 and the field of view 112 onto the photonic band gap array 104. The system 100 also includes a processor 120 in or out of the housing 102 and either local to the housing or connected to the focal plane array 106 from a remote location.

As should be apparent from the preceding description and the drawings, the present invention provides a system having improved sensitivity with reduced complexity in an infrared imaging system with minimal or no cooling, and a relatively lightweight and small size package compared to prior cryogenically-cooled infrared imaging systems. This imaging system could be used in a variety of imaging applications, and particularly for imaging infrared wavelengths of about 0.75 micrometer to about 1000 micrometers (1 millimeter), up to terahertz wavelengths of about 30 micrometers to about 1000 micrometers. The system also is much simpler to build in comparison to an interferometer or bolometer, particularly with respect to the photonic band gap material array useful at infrared wavelengths.

Although the invention has been shown and described with respect to certain illustrated embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention. In addition, while a particular feature of the invention may have been described above with respect to only one of several illustrated embodiments, such a feature may be combined with one or more other features of the other embodiment, as maybe desired and advantageous for any given or particular application.

We claim:

1. A system comprising:
   a source of narrow bandwidth electromagnetic radiation having a specified wavelength;
   an array of photonic band gap material cells positioned to receive the electromagnetic radiation from the source, each cell having a photonic band gap material with an absorption edge at about the emission frequency of the source of electromagnetic radiation;
   an optical assembly arranged to direct electromagnetic radiation from a field of view onto the photonic band gap array and thereby shift the absorption edge of the cells illuminated by the electromagnetic radiation from the field of view; and
   a focal plane array positioned to receive electromagnetic radiation from the photonic band gap array and to detect electromagnetic radiation with the specified wavelength,
   wherein the photonic band gap material has a lattice structure that expands approximately 0.25% per 10 C temperature rise, resulting in an approximately 4 to 10 decibel change in the transmission of the electromagnetic radiation.

2. A system as set forth in claim 1, wherein the source is selected from a laser and a light emitting diode.

3. A system as set forth in claim 1, wherein the source emits electromagnetic radiation having an approximately near infrared wavelength.

4. A system as set forth in claim 1, wherein the source is a 0.85 micrometer wavelength laser.

5. A system as set forth in claim 1, wherein the photonic band gap array is thermally isolated from the focal plane array.

6. A system as set forth in claim 1, wherein the photonic band gap array is thermally isolated from the focal plane array by an aerogel.

7. A system as set forth in claim 1, wherein the photonic band gap array includes a first material having a relatively low degree of thermal expansion and a second material having a relatively high degree of thermal expansion.

8. A system as set forth in claim 1, wherein the photonic band gap material has a high degree of absorption in a wavelength of interest to maximize absorption edge shift.

9. A system as set forth in claim 1, wherein the photonic band gap material has a high degree of absorption in an infrared wavelength of interest to maximize absorption edge shift.

10. A system as set forth in claim 1, wherein the photonic band gap material includes units of a first material dispersed within a second material at regular intervals of approximately "a", each unit of the first material having a dimension of approximately 2r, and a lattice constant is defined as r/a and decreases proportionately with temperature.

11. A system as set forth in claim 1, wherein the optical assembly includes a device which transmits electromagnetic radiation of a first wavelength and reflects electromagnetic radiation of a second wavelength.

12. A system as set forth in claim 1, wherein the focal plane array includes an image sensor.

13. A system as set forth in claim 1, wherein the focal plane array includes a charge coupled device (CCD).

14. A system as set forth in claim 1, wherein the photonic band gap array and the focal plane array are contained in a housing lined with a photonic band gap material that inhibits electromagnetic radiation with wavelengths of about eight to twelve micrometers.

* * * * *